Sept. 29, 1953     C. RODDA     2,653,908
SUBMERGED FILTER FOR AQUARIUMS
Filed Sept. 27, 1950
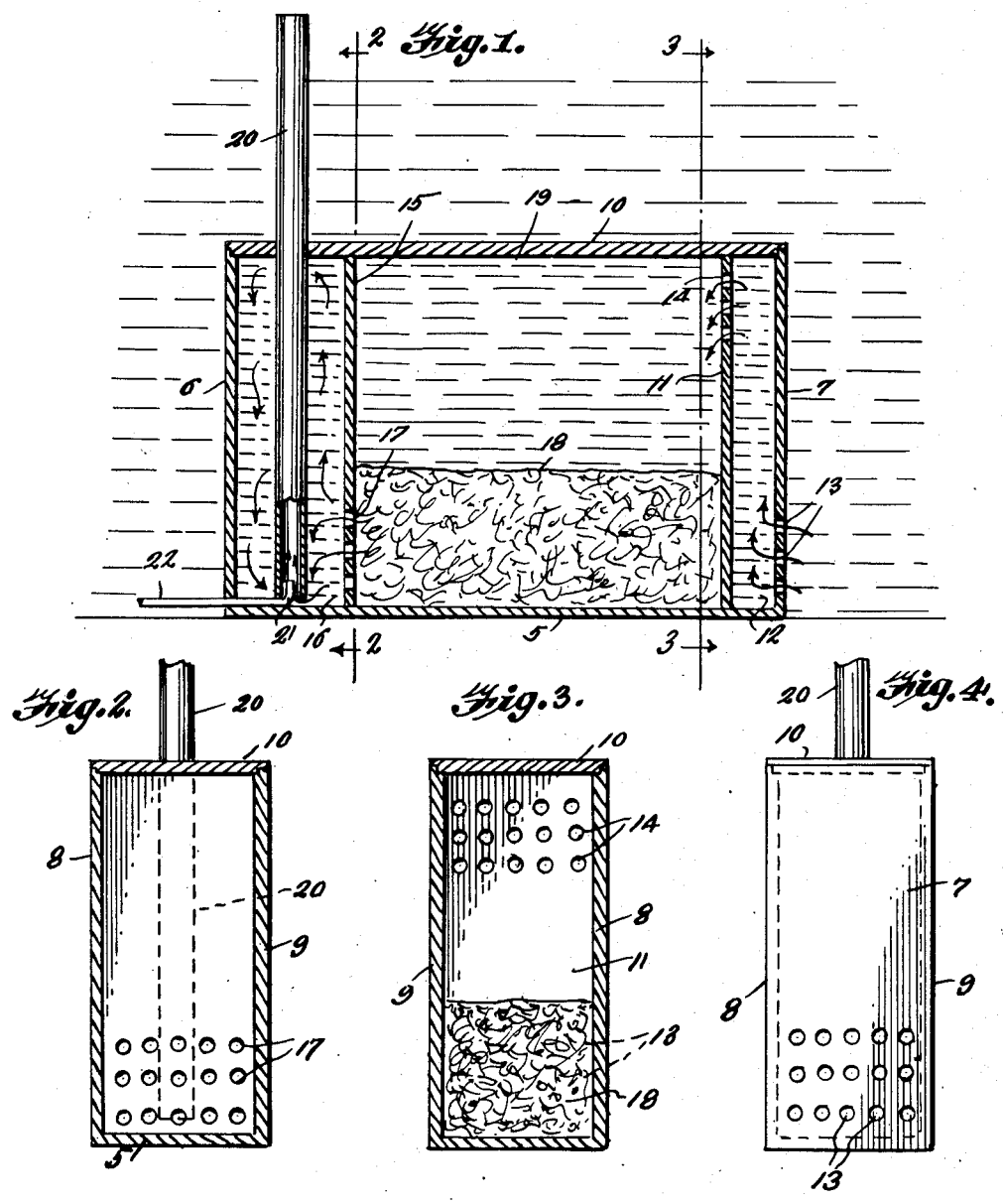
INVENTOR.
CLINTON RODDA
BY
*Patrick D. Beavers*
ATTORNEY Patented Sept. 29, 1953

2,653,908

UNITED STATES PATENT OFFICE 2,653,908

SUBMERGED FILTER FOR AQUARIUMS

Clinton Rodda, Los Angeles, Calif.

Application September 27, 1950, Serial No. 187,052

1 Claim. (Cl. 210—16)

This invention relates to improvements in water filters, especially adapted for aquariums.

The principal object of the present invention is to provide a submerged filter constructed to rest upon the bottom of an aquarium, where it can suck in foreign matter from adjacent and upon the bottom of the aquarium, without the utilization of tubes extending to this area.

Another object of the invention is to provide a fish aquarium filter, which due to its special construction cannot overflow or leak, due to the fact that it is a submerged structure.

Still another object of the invention is to provide a filter, which will operate on less air than most filters now on the market.

Still a further object of the invention is to provide a submerged aquarium filter, which may be conveniently concealed behind or under rock formations on the bottom of the aquarium, or else made in an ornate design, such as a treasure chest or some other appealing structure.

These and various other objects and advantages of the invention will become apparent to the reader of the following description.

In the drawing:

Figure 1 is a vertical sectional view through the box portion of the filtering assembly, showing the water outlet tube partly in section;

Figure 2 is a vertical transverse sectional view taken on line 2—2 of Figure 1;

Figure 3 is a vertical sectional view taken on line 3—3 of Figure 1;

Figure 4 is a fragmentary end elevational view looking at the water inlet end of the assembly.

Referring to the drawing, wherein like numerals designate like parts, it can be seen that the filtering assembly is generally in the form of a rectangular box, the same being composed of a bottom 5, end walls 6, 7, side walls 8, 9 and a removable top wall 10.

As can be seen in the drawing, the edge portion of the removable top wall 10 is preferably flanged to set over the upper edge of the box-like structure with the main portion of the top resting upon a shoulder inside of the box and in conjunction with this, suitable packing means may be employed if desired. A tight fit is of course desirable and handles can be employed in conjunction with the box and the top 10, if desired.

Within the box-like structure and in close space relation with respect to the end walls 7, is a partition 11, this partition in conjuction with the end walls 7 and other portions of the box-like structure serving to define a foul water inlet compartment 12. The end wall 7 is formed with foul water inlet openings 13, adjacent the lower portion thereof, so that water can enter this compartment 12. The upper portion of the partition 11 has water outlet openings 14.

A second partition 15 is provided in the box-like structure in spaced relation with respect to the end wall 6 to define a filtered water compartment 16, this compartment being substantially larger than the compartment 12. The lower portion of the partition 15 has a plurality of outlet openings 17, all below the top level of a mass of filtering material 18 situated at the lower portion of the existing compartment 19 between the partitions 11, 15, this compartment 19 being known as the filtering compartment. The filtering mass 18 can be spun glass and charcoal or any other suitable filtering medium.

Numeral 20 denotes a vertical tube which extends downwardly through an opening in the top wall 10, at a point overlying the compartment 6 and this tube, which is open, both at its upper and lower ends, is so positioned and secured to the top wall 10, as to fit over the upturned end 21 of an air supply pipe 22, when the top wall 10 is properly seated in position on the box-like structure. Obviously, the upturned end 21 of the air supply pipe 22, should project a substantial distance up into the pipe 20, so that air will not escape into the compartment 16 and further, this upturned end 21, must be adequately spaced from the lower interior of the tube 20, so that water can freely pass from the filtered water compartment 16 and upwardly through the tube 20 to pass out into the aquarium tank.

It can now be seen that when this filtering assembly is properly positioned on the bottom of an aquarium tank and connection with the air line 22 is made, the filtering assembly is ready for use and when air is supplied by way of the line 22, the air will force upwardly in the tube 20, expelling through the upper end thereof, into the water of the aquarium tank.

As this vertical movement takes place, a suction is created through the entire length of the assembly, foul water being drawn through the openings 13, at one end of the box-like structure and into the compartment 12. Subsequently by the same suction, the water passes out of the compartment 12, through the openings 14 and into the filtering compartment 19. The foul water is drawn through the filtering material 18 and out of the compartment 19 by way of the opening 17 to the filtered water compartment 16, and inasmuch as the upturned end 21 of the air supply line 22, creates a suction, this filtered water is sucked into the tube 12 and forced upwardly and out of the upper end, into the water of the aquarium tank.

Obviously, suitable sealing means should be provided at the entire upper edge of the compartment 16, so that no unfiltered water will enter the filtered water compartment. A suitable packing may be employed for this purpose or some other suitable sealing agent.

While the foregoing description sets forth the invention in specific terms, it is to be understood that numerous changes in the shape, size and materials may be resorted to, without departing from the spirit and scope of the invention as claimed hereinafter.

Having described the invention, what is claimed as new is:

A submerged filter for aquariums comprising an enclosure with a central compartment and a pair of end compartments, a filter disposed in the lower portion of the central compartment, a bad water inlet at the lower portion of one end compartment, an outlet to the central compartment at the upper portion of the said last mentioned end compartment, an outlet from the central compartment at one end of the filtering material, a pipe depending into the remaining end compartment and terminating above the bottom thereof and an air supply line disposed into the last mentioned end compartment and having a portion disposed up into said pipe, to cause an upward suction therein when air is disposed through said air supply line.

CLINTON RODDA.

References Cited in the file of this patent

UNITED STATES PATENTS

| Number | Name | Date |
| --- | --- | --- |
| 242,759 | Daniels | June 14, 1881 |
| 244,262 | Land | July 12, 1881 |
| 894,056 | Rogers | July 21, 1908 |
| 1,055,082 | Rogers | Mar. 4, 1913 |
| 1,182,465 | Evans | May 9, 1916 |
| 2,293,051 | Duffy | Aug. 18, 1942 |

FOREIGN PATENTS

| Number | Country | Date |
| --- | --- | --- |
| 9,287 | Great Britain | A. D. 1893 |